Figure 1:
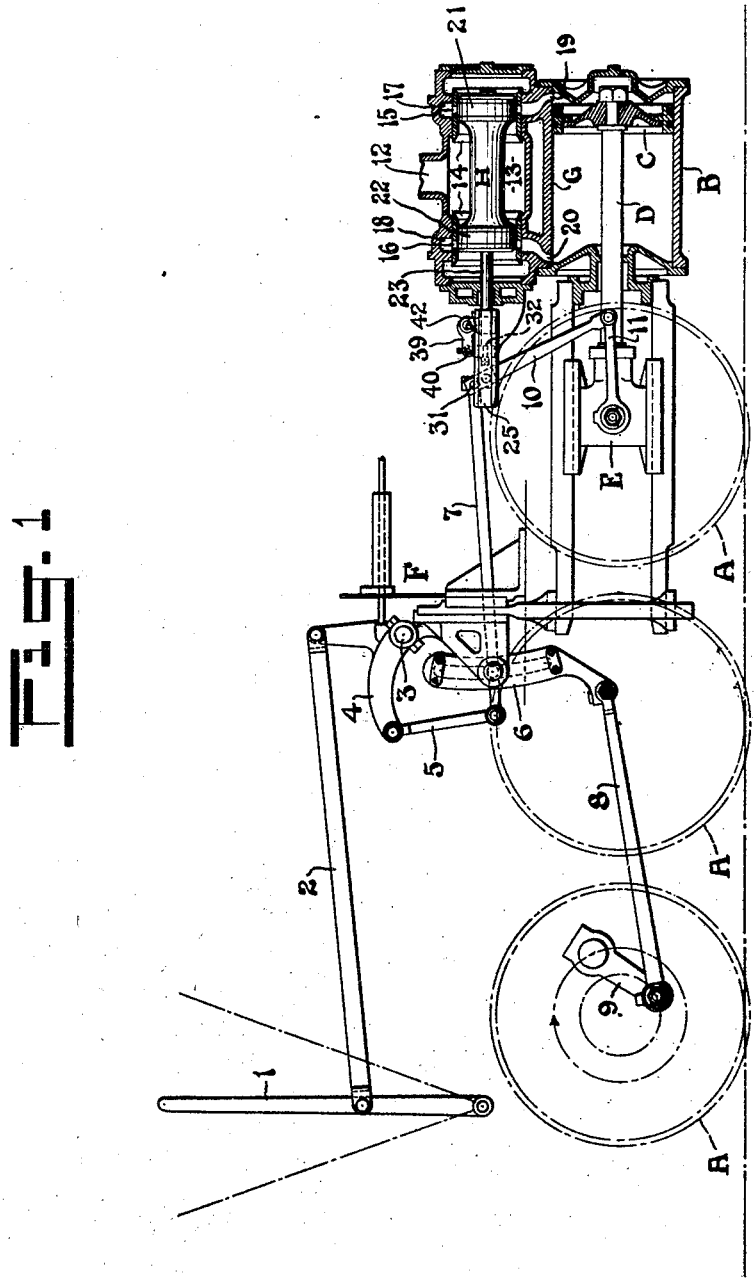

Dec. 16, 1947. C. F. BERRY 2,432,649
TRANSMISSION ACTUATED ENGINE VALVE MECHANISM
OF THE COMBINATION GEAR TYPE
Filed Feb. 6, 1942 4 Sheets-Sheet 1

INVENTOR.
Clyde F. Berry
BY
William Pelzer
ATTORNEY

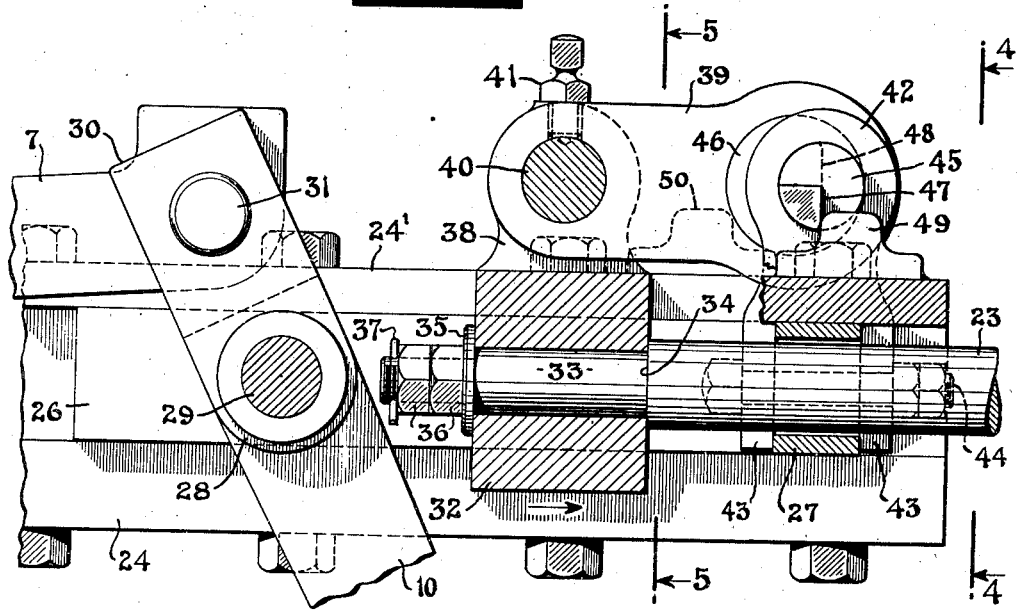
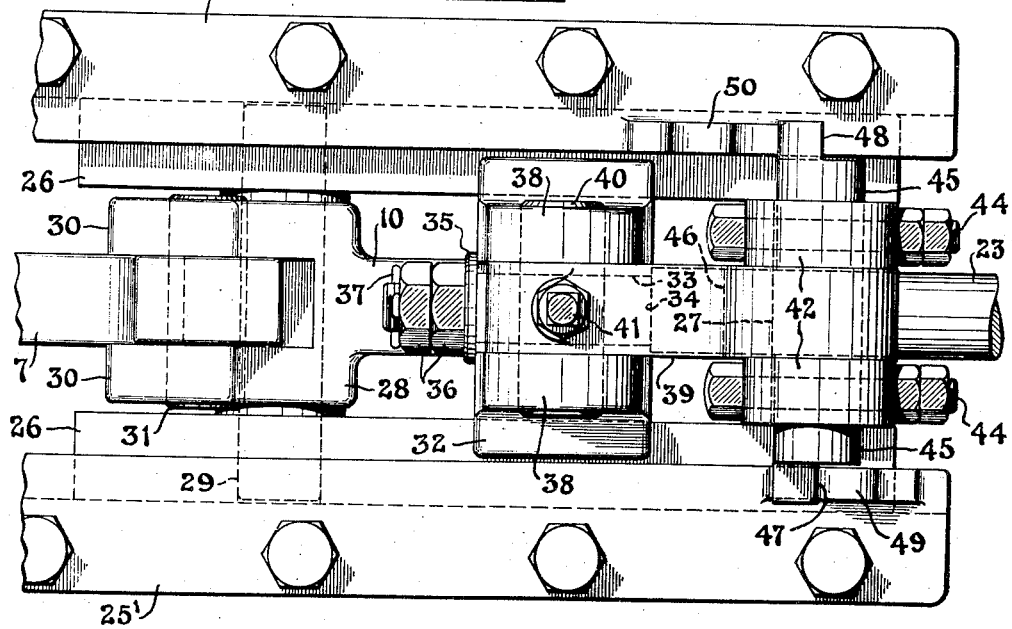

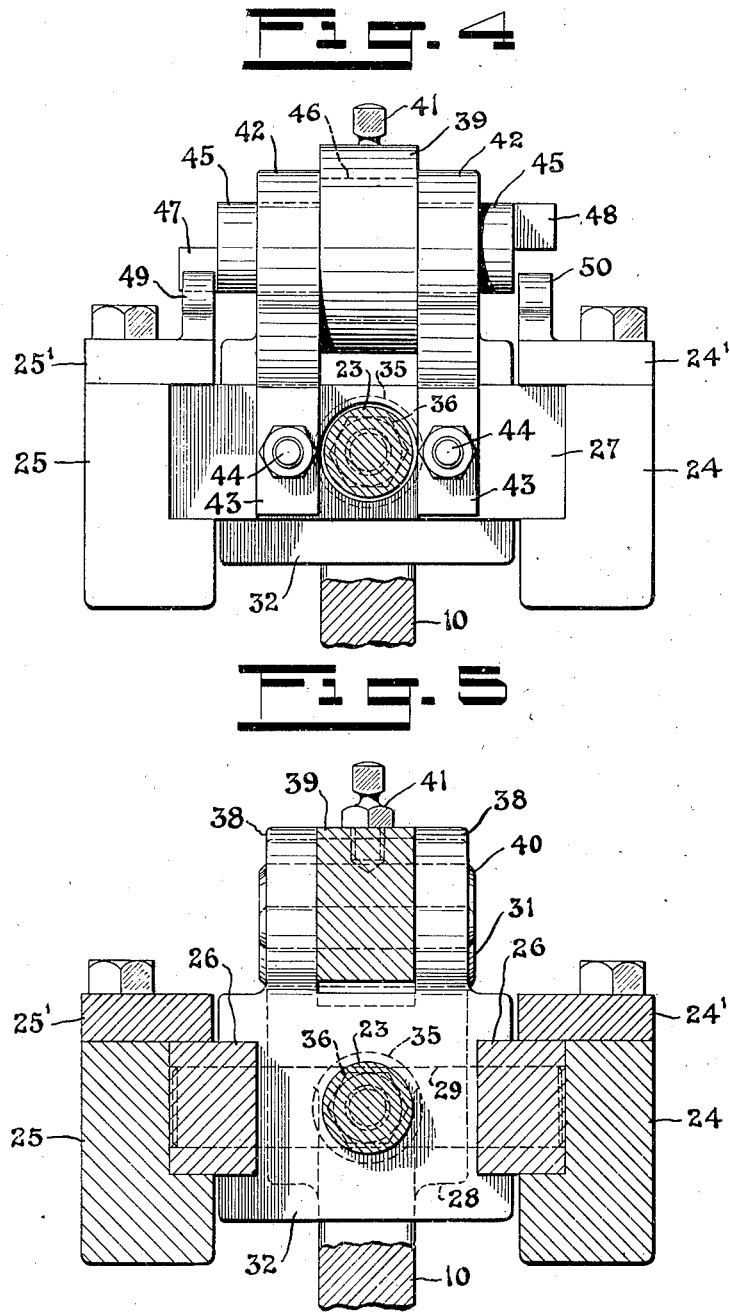

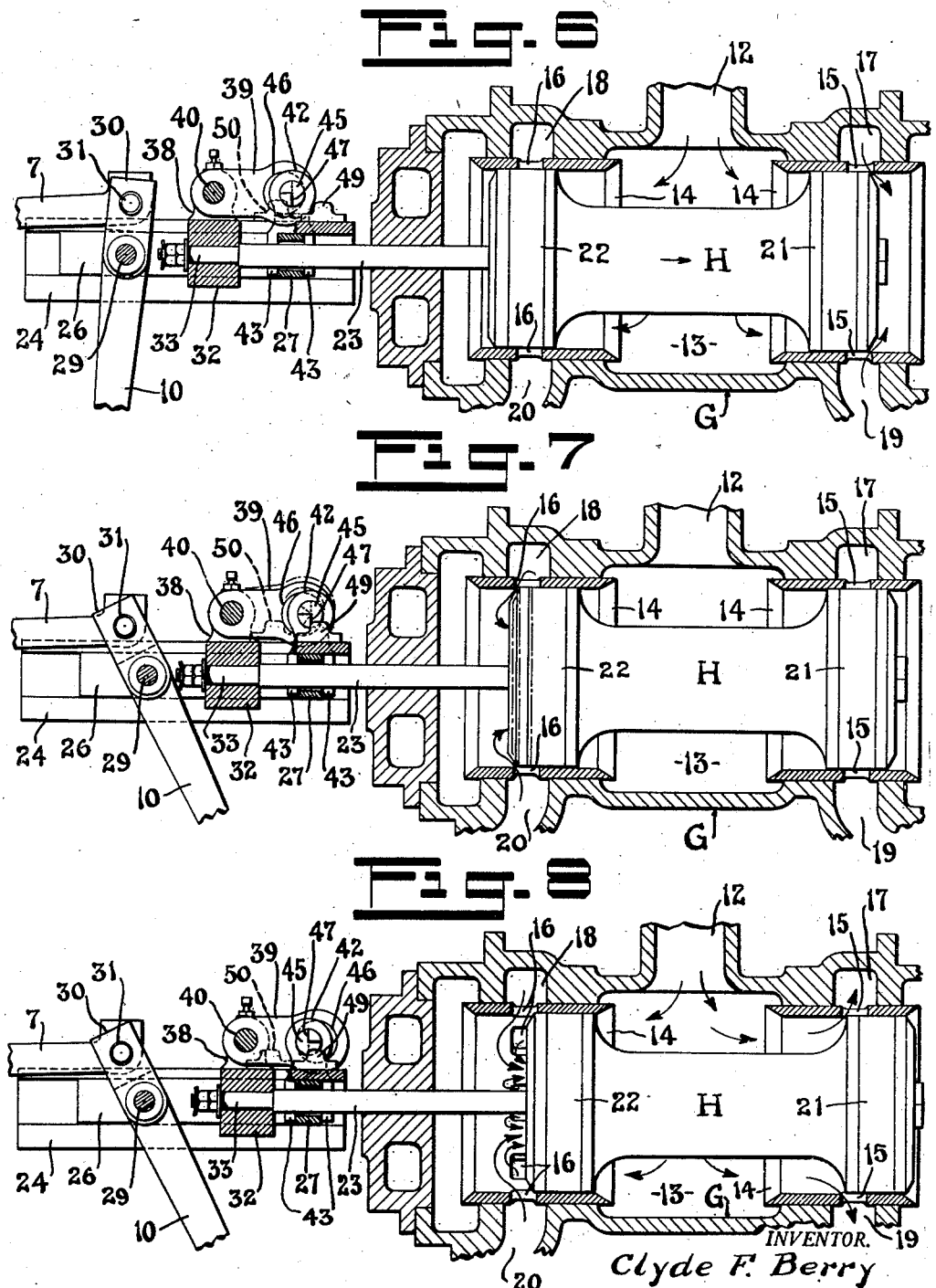

Patented Dec. 16, 1947

2,432,649

UNITED STATES PATENT OFFICE 2,432,649

TRANSMISSION ACTUATED ENGINE VALVE MECHANISM OF THE COMBINATION GEAR TYPE

Clyde F. Berry, Manchester, N. H.

Application February 6, 1942, Serial No. 429,723

15 Claims. (Cl. 121—163)

This invention relates to mechanism for actuating and controlling the movement and timing of slide valves of any type for controlling the admission, compression and exhaust periods of the expansible actuating fluid or vapor at the piston cylinder of engines, particularly steam engines and more particularly locomotive engines, and especially to engines provided with piston slide valves.

One object of the invention is to provide a mechanism whereby the timing of the slide valve may be accurately set for functioning with different types of engines of high or low speed and various types of valve gear. A further object is to provide means whereby the valve may be set for any desired predetermined opening of the ports, and means whereby the valve may be actuated and controlled to provide automatic and independent accelerated movement of the valve equally at both ends of the stroke, and whereby the full predetermined opening of the admission ports to the piston cylinder is instantaneously obtained; longer expansion period with reduced back pressure; rapid full opening of the exhaust ports; and thereby obtaining increased efficiency. A further object is to provide a mechanism in which the timing or controlling elements are entirely external to the valve chamber, whereby slide valves of standard types may be employed having no separate or auxiliary moving elements within the valve chamber, and whereby the functioning of the valve may at all times be adjusted and observed from without the valve chamber.

In carrying the invention into effect I provide a transmission device for connection between the valve stem and the actuating means through which reciprocating movement is imparted to the valve, and which transmission device has two functions. One function is to automatically vary the length of the connection between the valve and the actuating member of the valve gear to impart longer or additional movement to the valve at both ends of the valve stroke relative to the movement of the driving piston which the valve controls and independently of the length of movement of such actuating member. The second and more important function is to provide an articulated connection between the valve stem and actuating member whereby the valve may automatically be given an additional and accelerated movement imparted thereto by the exhaust steam at both ends of the valve stroke independently of the movements of the valve gear. In the preferred form of the transmission device I employ a connection between the valve stem and the valve actuating gear consisting of an eccentric and link whereby when the valve reaches a definite position the eccentric is caused to rotate which varies the length of the connection between the valve stem and the actuating member of the valve gear, and simultaneously permits the valve stem and valve to move independently of the valve actuating gear, thereby permitting additional movement of the valve relative to the actuating gear due to pressure of the exhaust steam to impart a rapid independent uniform movement to the valve at the end of each forward and backward stroke.

The invention is illustrated in the accompanying drawings as applied to a locomotive engine, and in which, Figure 1 is a schematic view of a locomotive valve gear of the Walschaert centrally pivoted link type with the transmission device of the present invention applied thereto.

Figure 2 a longitudinal section of the preferred form of the transmission device.

Figure 3 a plan view of the parts shown in Figure 2.

Figure 4 an end view looking in the direction of the arrows at the line 4—4 of Figure 2.

Figure 5 a vertical cross-section on the line 5—5 of Figure 2.

Figure 6 a longitudinal vertical section through the steam chest showing the piston valve during movement in the direction of the arrow and in the position corresponding to the forward stroke of the driving piston after cut-off and before closure of the exhaust at the forward end of the valve.

Figure 7 a similar view showing the valve advanced from the position of Figure 6 to complete closure of exhaust at the forward port and start of exhaust at the rear port and beginning of the independent movement at the transmission device preparatory to independent movement of the valve due to the exhaust pressure, and showing in dotted lines the movement of the transmission device, and Figure 8 a similar view showing the valve advanced from the position of Figure 7 to full exhaust at the rear port and full admission at the forward port corresponding to the full forward stroke of the driving piston and beginning of the return stroke, and showing the eccentric disk turned to dead center opposite to the position of Figure 6.

Referring to the drawings, and more particularly to Figure 1, A indicates the driving wheels of a locomotive, B the driving cylinder, C the driving piston, and D the piston rod coupled to the driving cross-head E. The driving connections between the cross-head and wheels are omitted. The valve gear illustrated is of the centrally pivoted link type and is indicated generally by the letter F and comprises reversing lever 1, reach rod 2, reverse shaft 3, lift lever 4 and link 5, slotted centrally pivoted reverse link 6, radius rod 7, eccentric rod 8, eccentric crank 9, combining lever 10, and cross-head link 11. G indicates the usual steam chest having steam supply port 12, chamber 13, cylindrical valve sleeves 14 provided with circumferential ports 15 and 16 opening into circumferential chambers 17 and 18, respectively, and which chambers are connected by ports 19 and 20, respectively, to the fore and aft ends of the driving cylinder B. The usual exhaust ports will be provided at both ends of the steam chest, but to avoid confusion these ports are not shown in the drawings. The piston valve H is the usual cylindrical piston of the spool type having valve heads 21 and 22 and valve stem 23. The shank of the spool H affords ample clearance for the entrance of steam into chamber 13 and curves outward at both ends to the edge of the valve heads to present uniform pressure surfaces on the inner sides of the valve heads so that the steam pressure in chamber 13 will have a balancing effect on the spool. The valve heads in practice will be provided with the usual spring packing rings but otherwise will have no separate movable parts for the valve timing.

The connection of the radius rod and combining lever to the valve stem 23 is an articulated one to permit longitudinal movement of the valve relative to the radius rod and combining lever independently of the movements imparted thereto through the operating movements of the other elements of the valve gear. This transmission may be accomplished in various ways to provide the desired push and pull at valve stem 23 by the radius rod and combining lever and the independent movement of the valve relative thereto. However, it is desirable that there be no loose connection which would result in lost motion, ramming, rattling, pounding and undue wear, and such connection should provide a positive, unyielding straight-line push and pull movement to insure constant uniform functioning of the valve. Therefore, as a preferred form of the articulated transmission device a compound slide is provided, to one element of which the radius rod and combining lever are pivotally connected, and to the other element of the compound slide the valve stem is adjustably secured through an extensible connection, and the two elements of the compound slide are connected together by a pivoted link and eccentric which form an extensible connection between the slide members. This eccentric connection also provides the means for permitting movement of the valve independently of the movement imparted by the valve gear.

The preferred construction of the transmission device as shown in Figures 2 to 5 has two fixed channelled guides 24 and 25 which in practice will be suitably supported and rigidly held upon the frame of the engine, according to the type of engine with which the valve gear is employed, and in proper alignment with the valve and steam chest. Adapted to slide within the channels of the guides is one element of the compound slide in the form of a slotted plate or U-shaped slide 26 having a central perforation at the cross-bar 27. The combining lever 10 has a hub 28 which is pivoted between the free ends of slide 26 by pin 29 seated in holes bored through the slide as shown in dotted lines in Figure 3. This lever has a bifurcated upper end 30 between which is pivoted the radius rod 7 by pin 31. By this means the combined reciprocation of the radius rod 7 and the swing of the combining lever 10 is translated into fore and aft reciprocation of the slide 26. Mounted for sliding movement on slide 26 is the second element of the compound slide in the form of a channelled cross-head 32 having a central bore for the close fitting reduced end 33, Figure 2, of the valve stem 23 which is firmly secured against longitudinal movement in the cross-head by the shoulder 34 on the stem, washer 35, nuts 36 and cotter-pin 37. It will be observed that the distance between the valve heads 21—22 and the cross-head 32 may be adjusted or varied, for instance, by placing the washer 35 or a washer of desired thickness between the cross-head and shoulder 34. The upper side of cross-head 32 is extended to form a pair of bearings 38 for eccentric link 39 which is pivoted between the bearings by pin 40, the pin being held against endwise movement by set-screw 41. Mounted on cross-bar 27 are bearings 42 which have arms 43 machined to closely fit the cross-bar and bolted thereto by bolts 44. These bearings in practice may be formed integral with the cross-bar, but I prefer to have the bearings 42 separate and bolted to the cross-bar. Journalled in bearings 42 is the stub-shaft 45 having the eccentric section or disk 46, Figure 2, between bearings 42 and this eccentric is journalled in the eccentric link 39. The shaft 45 is free to rotate in bearings 42, and with its eccentric section 46 serves primarily as a coupling pin for the link connection between the members 26 and 32 of the compound slide. The perforation in cross-bar 27, as seen in Figure 2, is of a diameter to afford ample clearance for valve stem 23 and permit free longitudinal movement of the stem through the cross-bar without frictional retardation in the functioning of the compound slide. Both ends of the stub-shaft 45 project beyond its bearings 42, Figure 4, and both ends are cut to form projecting segments having contact faces 47 and 48 in the same vertical plane as viewed in Figure 2, face 47 being below and face 48 above the horizontal plane as indicated by the dotted line. In line with segments 47 and 48, respectively, are a pair of lugs 49 and 50 projecting upward from the top plates 24' and 25' of guides 24 and 25 and shown as integral therewith. In practice these lugs may be blocks adjustably mounted on the guides to adjust the points of contact of segments 47 and 48 with lugs 49 and 50, respectively, but it is preferred to have these lugs integral with top plates 24' and 25', and in order to adjust the positions of lugs 49 and 50 relatively to each other and to the segments 47 and 48, the top plates 24' and 25' are adjusted longitudinally on guide blocks 24 and 25.

The object of segments 47 and 48 contacting with lugs 49 and 50 is to rotate the eccentric disk 46 from its dead center position at either end of the valve stroke. In Figure 2, which is an enlarged illustration of the compound slide transmission device in the same position as shown in Figure 7, the slide 26 is shown approaching the end of its forward movement in the direction indicated by the arrow, and segment face 47 just contacting lug 49. As the movement of the slide continues, the engagement of segment 47 with lug 49 causes the eccentric disk 46 to rotate in a clockwise direction, which first tends to lengthen the distance between the valve heads 21—22 and the pivot centers of the radius rod and combining lever, thereby increasing the steam expansion period in the piston cylinder, and due to the rotation of the eccentric disk 46, from its dead center position, the pressure of the exhaust steam is now free to rapidly shift the valve spool forward carrying slide member 32 along with it independently of the movement of slide member 26 by rod 7 and lever 10. The pull of the valve in this movement through its valve stem connection with the cross-head slide member 32 imparts a secondary movement to the slide member 32 causing it to move on toward the cross-bar 27 of slide member 26, and as the segment face 47 during this movement approaches a horizontal position, the independent movement of the valve due to the exhaust pressure continues the rotation of the eccentric disk until it arrives at its dead center position opposite to the position of Figure 7 as seen in Figure 8, which is the end of the independent exhaust movement and beginning of the admission period at valve head 21 and port 19, at which time the position of the valve head and members of the transmission device will be as shown in Figure 8. This movement of the valve head, slide member 32 and the eccentric connection due to the exhaust steam pressure on the valve is very rapid and results in a quick full opening of the exhaust ports 16 and opening of admission port 19 to start the return stroke of the driving piston.

The positions of the driving piston and valve heads as shown in Figure 8 indicates the extreme forward stroke, and the admission of steam through port 19 as indicated in Figure 8 is the beginning of the return stroke of the driving piston assuming the valve gear to be set for forward drive. The valve-head will start its return stroke through the direct pull of the radius rod and swing of the combining lever acting upon the compound slide transmission device to pull the slide member 26 in the direction opposite to the arrow in Figure 2. This backward movement of slide member 26 carries slide member 32 backward in unison therewith through the connecting link and dead center position of the eccentric and pulls valve stem 23 and the valve-head in the same direction. During this backward movement the slide members 26 and 32 remain in the relative positions shown in Figure 8 and remain in that relation until the segment 48 of the eccentric shaft 45 contacts lug 50, whereupon the eccentric starts from its dead center position of Figure 8 and the slide member 32 begins its auxiliary movement on the slide member 26 to impart the increased movement to the valve head. In this movement the valve-head moves backward from the position of Figure 8, through the position of Figure 7 and back to the position of Figure 6; first reducing the admission at port 19 and the exhaust at port 20; then cutting off the admission at port 19 and further reducing the exhaust at port 20, and finally closing the exhaust at port 20 and opening the exhaust at port 19. At this period the exhaust pressure is entirely cut off from valve-head 22 and eccentric 46 will have rotated sufficiently to allow the exhaust pressure on head 21 to start the rapid independent movement of the valve-head. The eccentric disk 46 during this movement is rotated 180° back to its dead center position of Figure 6 as the valve-head continues its rapid independent movement to the full backward position and the valve gear continues its movement in unison with the driving piston until the valve-head, radius rod and combining lever arrive at the position fully opposite to that of Figure 8. The driving piston will now be at its extreme rearward position and admission of steam to the piston cylinder will start through port 20 while the exhaust at port 19 is fully open. As the valve-head now starts moving in the direction of the arrow in Figure 6 the admission at port 20 is cut off while the exhaust port 19 is still open and then the exhaust is closed at port 19 and opened at port 20 as shown in Figure 7, whereupon the eccentric of the transmission device operates as before to permit the exhaust from port 20 to rapidly effect the opening of port 19 for the admission of steam to the forward end of the piston cylinder as shown in Figure 8, thus completing a full cycle of the valve operation.

It will be evident that the connections between the valve stem and valve gear may be readily altered to change the length of movement of the valve-head by adjusting the connection of the stem to the slide member 32 and changing the link 39 and eccentric 46. To change link 39 and eccentric 46 the pivot pin 40 is removed and bearings 42 are disconnected from cross-bar 27. A different link, longer or shorter, with an eccentric of appropriate diameter may be substituted. This change will vary the length of movement of the valve-head relative to the valve-gear without having to disturb the valve-head and steamchest. Thus by this means and adjustment of the valve stem connection to the cross-head slide member 32 a definite visual means for adjusting the movements of the valve-head are provided.

In practice the valve gear will be adjusted and set in the usual manner relative to the engine driving mechanism, and to adjust the valve-head for the desired lap and lead the transmission device is adjusted without the necessity of readjusting the valve gear.

It will be understood that various changes may be made in the structure and operation of the transmission device without departing from the spirit of my invention, the main object being to secure the independent movement of the valve-head due to the exhaust pressure by means external to the steam chest. The term articulated connection is meant to include any type of connection between the valve stem and the valve actuating gear which will vary the length between the valve-head and the actuating member of the valve gear without lost motion, and which will provide uniform direct push and pull of the valve-head, and permit equal uniform movement thereof at both ends of the stroke due to pressure of exhaust fluid independently of the actuating member of the valve gear.

What I claim is:

1. In a valve gear for engines, the combination with a valve and valve gear, of a transmission device connected between the valve stem and the actuating gear, said device comprising coupling members which co-operate during part of the valve stroke to transmit invariable direct push and pull from the valve actuating gear to the valve stem, and means co-operating with said transmission device for altering the operative connection between said coupling members at both ends of the valve stroke to permit additional movement of the valve independently of the actuating gear.

2. In a valve gear for engines, the combination with the valve and valve gear, of a transmission device connected between the valve stem and the actuating gear, said device comprising coupling members and means whereby the valve is permitted to move at both ends of the valve stroke independently of the movement imparted by the valve gear.

3. In a valve gear for engines, the combination with the valve and valve gear, of a transmission device connected between the valve stem and the actuating gear, said device comprising coupling members through which definite uniform length of push and pull is imparted to the valve, and adjustable means whereby additional uniform length of movement is imparted to the valve independently of the valve gear at both ends of the valve stroke.

4. In a valve gear for engines, the combination with the valve and valve gear, of a transmission device connected between the valve stem and the actuating gear, said device comprising coupling members and means whereby auxiliary movement may be imparted to the valve by exhaust pressure independently of the movement imparted by the valve gear.

5. In a valve gear for engines, the combination with the valve and valve gear, of a transmission device connected between the valve stem and the actuating gear, said device comprising coupling members whereby uniform length of positive push and pull is transmitted from said actuating gear to the valve stem, and means co-operating with said coupling members whereby uniform auxiliary movement may be imparted to the valve at both ends of the valve stroke by exhaust pressure independently of the movement imparted by the valve gear.

6. In a valve gear for engines, the combination with the valve and valve gear, of a transmission device connected between the valve stem and the actuating gear, said device comprising a coupling member connected to said actuating gear, a coupling member connected to the valve stem, means connecting said coupling members together for movement as a unit and whereby invariable direct push and pull is transmitted from said actuating gear to the valve stem, and means whereby movement of said coupling members relative to each other is effected at both ends of the valve stroke to permit auxiliary movement of the valve.

7. In a valve gear for engines, the combination with the valve and valve gear, of a transmission device connected between the valve stem and the actuating gear, said device comprising a compound slide, one member of which is connected to said actuating gear, a second slide member mounted on said first named slide member for movement in unison therewith and connected to the valve stem, means connecting said slides whereby positive push and pull is transmitted from the first named slide member to the second named slide member, and means whereby uniform movement of said slide members relative to each other is effected at both ends of the valve stroke.

8. In a valve gear for engines, the combination with the valve and valve gear, of a transmission device connected between the valve stem and the actuating gear, said device comprising a compound slide, one member of which is connected to said actuating gear, a second slide member mounted on said first named slide member for movement in unison therewith and connected to the valve stem, a link and eccentric connection between said slide members whereby positive push and pull is transmitted from the first named slide member to the second named slide member, and means for causing said eccentric to rotate to effect movement of said slide members relative to each other.

9. In a valve gear for engines, the combination with the valve and valve gear, of a transmission device connected between the valve stem and the actuating gear, said device comprising a compound slide, one member of which is connected to said actuating gear, a second slide member mounted on said first named slide member for movement in unison therewith and connected to the valve stem, a link and eccentric connection between said slide members whereby positive push and pull is transmitted from the first named slide member to the second named slide member, and oppositely disposed means for causing said eccentric to rotate in opposite directions successively at each half of the complete cycle of the valve movement to effect movement of said slide members relative to each other.

10. In a valve gear for engines, the combination with the valve and valve gear, of an articulated connection between the valve stem and the actuating gear whereby the movement of the actuating gear is transmitted in invariable degree to the valve stem during part of the valve stroke, and means for altering said connection at each end of the stroke for permitting additional movement of the valve.

11. In a valve gear for engines, the combination with the valve and valve gear, of an articulated connection between the valve stem and the actuating gear for transmitting movement from the valve gear to the valve, and means whereby uniform auxiliary movement of the valve is obtained at both ends of the stroke due to exhaust pressure on the valve independently of the movement imparted by the valve gear.

12. In a valve gear for engines, the combination with a balanced valve, of a valve gear actuated in unison with the engine piston, an articulated connection between the valve stem and actuating gear, and means co-operating with said connection whereby uniform auxiliary movement of the valve is obtained at both ends of the stroke due to exhaust pressure on the valve independently of the movement imparted by the valve gear in unison with the engine piston.

13. In a valve gear for engines, the combination with a duplex piston valve and valve gear, of an articulated connection between the valve stem and actuating gear for transmitting movement from the valve gear to the valve, and means whereby uniform auxiliary movement of the valve is obtained at both ends of the stroke due to exhaust pressure on the outlet sides of the valve heads independently of the movement imparted thereto by the valve gear through said articulated connection.

14. In apparatus of the class described, the combination with an engine cylinder and driving piston, of a fluid chamber having a central inlet port, a duplex piston slide valve therein balanced by the pressure from the inlet port, exhaust ports at opposite ends of said chamber, valve gear actuated in unison with the engine piston, an articulated connection between said gear and the valve stem for transmitting movement from the valve gear to the valve, and means co-operating with said connection whereby uniform auxiliary movement of the valve is obtained at both ends of the stroke due to exhaust pressure on the outlet sides of the valve heads independently of the movement imparted thereto by the valve gear through said articulated connection.

15. In apparatus of the class described, the combination with an engine cylinder and driving piston, of a fluid chamber having a central inlet port, a duplex piston slide valve therein balanced by the pressure from the inlet port, exhaust ports at opposite ends of said chamber, a valve gear actuated in unison with the engine piston, a transmission device connected between the valve stem and actuating gear, said device comprising a slide member coupled to the actuating gear, a second slide member mounted on said first named slide member and coupled to the valve stem, and a link and eccentric connection between said slide members for locking said members together whereby positive push and pull is transmitted from the first named slide member to the second named slide member, and means for causing said eccentric to rotate in opposite directions at the ends of the valve stroke to permit independent movement of the valve due to the exhaust pressure at the outlet sides of the valve heads.

CLYDE F. BERRY.

REFERENCES CITED

The following references are of record in the file of this patent:

UNITED STATES PATENTS

| Number | Name | Date |
|---|---|---|
| 548,597 | Stevens | Oct. 22, 1895 |
| 1,151,237 | Ball et al. | Aug. 24, 1915 |
| 1,634,335 | Muchnic | July 5, 1927 |
| 2,082,092 | Baker | June 1, 1937 |
| 2,194,970 | Clark | Mar. 26, 1940 |